(12) United States Patent
Rohrbaugh et al.

(10) Patent No.: US 7,281,367 B2
(45) Date of Patent: Oct. 16, 2007

(54) STEERABLE, INTERMITTENTLY OPERABLE ROCKET PROPULSION SYSTEM

(75) Inventors: Eric M. Rohrbaugh, Elkton, MD (US); Jeffrey M. White, Hockessin, DE (US)

(73) Assignee: Alliant Techsystems Inc., Edina, MN (US)

( * ) Notice: Subject to any disclaimer, the term of this patent is extended or adjusted under 35 U.S.C. 154(b) by 192 days.

(21) Appl. No.: 10/728,733

(22) Filed: Dec. 5, 2003

(65) Prior Publication Data

US 2005/0120703 A1 Jun. 9, 2005

(51) Int. Cl.
*F02K 9/00* (2006.01)

(52) U.S. Cl. .......................... 60/253; 60/204
(58) Field of Classification Search .............. 60/229, 60/235, 242, 254, 200.1, 222, 224, 228, 234, 60/253, 256; 239/265.27

See application file for complete search history.

(56) References Cited

U.S. PATENT DOCUMENTS

| | | | | |
|---|---|---|---|---|
| 3,122,884 A | * | 3/1964 | Grover et al. ............... | 60/252 |
| 3,139,725 A | * | 7/1964 | Webb ......................... | 60/229 |
| 3,330,114 A | * | 7/1967 | McQueen .................... | 60/204 |
| 3,353,354 A | * | 11/1967 | Friedman et al. ........... | 60/203.1 |
| 3,532,297 A | * | 10/1970 | Maes .......................... | 244/169 |
| 3,724,217 A | * | 4/1973 | McDonald ................... | 60/254 |
| 3,812,671 A | * | 5/1974 | Burr et al. .................. | 60/39.47 |
| 3,826,087 A | | 7/1974 | McDonald | |
| 3,999,379 A | * | 12/1976 | LeFebvre ...................... | 60/204 |
| 4,011,720 A | * | 3/1977 | Kirschner, Jr. ............... | 60/254 |
| 4,017,040 A | * | 4/1977 | Dillinger et al. ............ | 244/3.22 |
| 4,550,888 A | * | 11/1985 | Douglass et al. ........... | 244/3.22 |
| 4,826,104 A | * | 5/1989 | Bennett et al. ............. | 244/3.22 |
| 4,840,024 A | | 6/1989 | McDonald | |
| 4,866,930 A | | 9/1989 | Fling et al. | |
| 5,062,593 A | * | 11/1991 | Goddard et al. ............. | 244/169 |

(Continued)

FOREIGN PATENT DOCUMENTS

EP 0 767 872 B1 6/2000

OTHER PUBLICATIONS

Fiber Materials, Inc., "Advanced Carbon Fiber Reinforced Silicon Carbide Technology for SM3 Divert and Attitude Control Systems," pp. 1-8, no date.
Alliant Techsystems Motor Schematics, 5 pages.

*Primary Examiner*—William H. Rodriguez
(74) *Attorney, Agent, or Firm*—TraskBritt

(57) ABSTRACT

A propulsion system including an extinguishable rocket motor and an incorporated maneuver control system. The rocket motor may be of the solid fuel type. One or more proportional axial thrust valves in communication with a pressure vessel or motor case containing a solid fuel propellant may be used to release combustion products for creating axial thrust. A plurality of proportional maneuver control valves in communication with the pressure vessel and having associated maneuver control thrusters may be selectively actuated in different modes of operation to provide control of pitch, yaw and roll. Fully opening all valves in communication with the pressure vessel may be used to cause rapid depressurization to extinguish the propellant. Reignition of the rocket motor may be effected upon repressurization of the pressure vessel through closing at least some of the valves. Ignition grains may be employed to shorten reignition time, and multiple propellant grains may be provided for multiple pulses.

46 Claims, 9 Drawing Sheets

U.S. PATENT DOCUMENTS

| | | | |
|---|---|---|---|
| 5,600,946 A | 2/1997 | Dombrowski et al. | |
| 5,765,367 A * | 6/1998 | Denoel et al. | 60/229 |
| 5,808,231 A | 9/1998 | Johnston et al. | |
| 6,250,072 B1 * | 6/2001 | Jacobson et al. | 60/251 |
| 6,289,669 B1 | 9/2001 | Smirra | |
| 6,354,074 B1 | 3/2002 | Jones et al. | |
| 6,367,244 B1 | 4/2002 | Smith et al. | |
| 6,393,830 B1 | 5/2002 | Hamke et al. | |
| 6,470,669 B2 | 10/2002 | Jones et al. | |
| 6,502,384 B1 * | 1/2003 | Onojima et al. | 60/229 |
| 2001/0045248 A1 * | 11/2001 | Jacobson et al. | 149/74 |

* cited by examiner

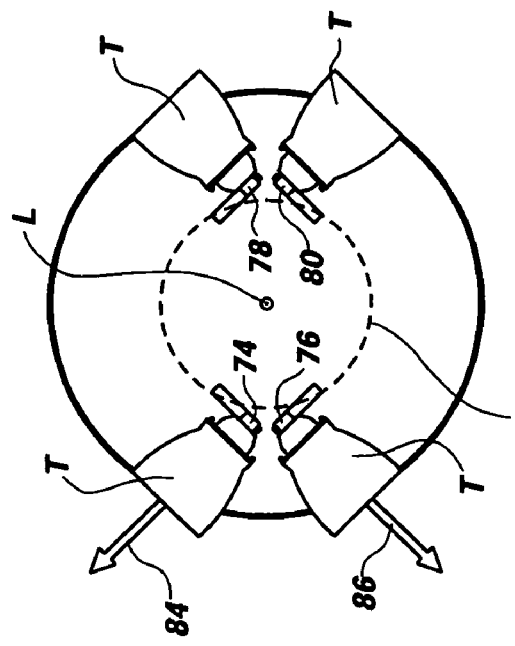
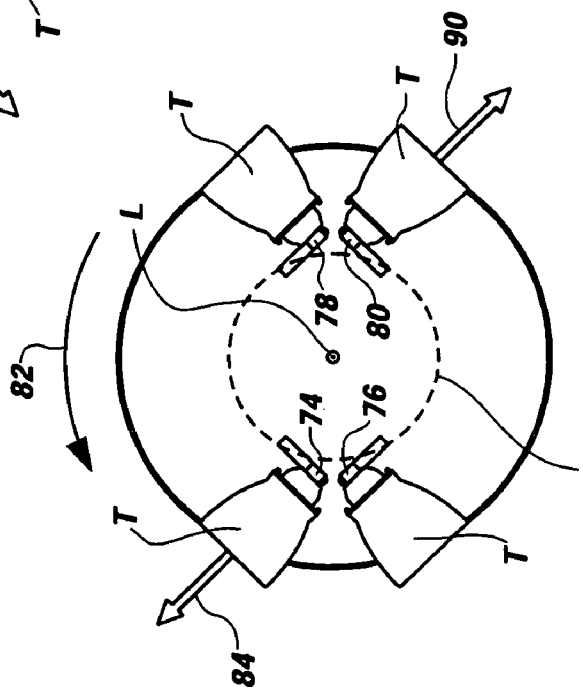
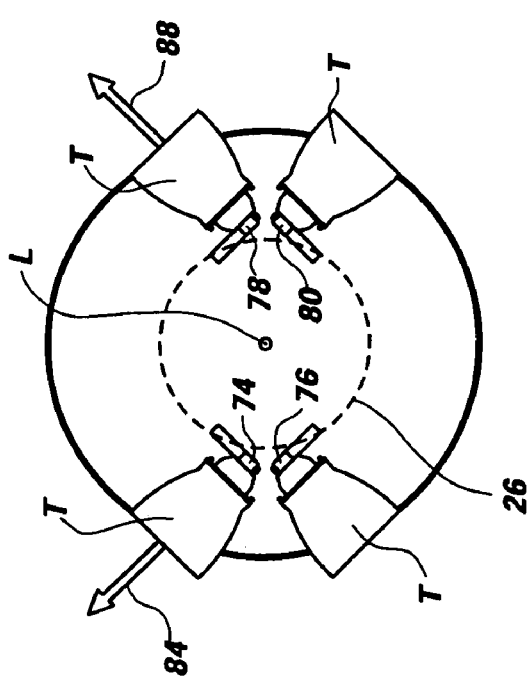
FIG. 7
FIG. 8
FIG. 6

STEERABLE, INTERMITTENTLY OPERABLE ROCKET PROPULSION SYSTEM

BACKGROUND OF THE INVENTION

1. Field of the Invention

The present invention relates to a rocket propulsion system configured for intermittent operation and steerability.

2. State of the Art

In a multi-stage rocket motor propulsion system, an upper stage rocket motor carrying a payload typically sits atop one or more lower stage rocket motors. Each stage of a multi-stage rocket motor-propelled vehicle is separated and discarded once the fuel thereof has been consumed. Discarding successive rocket motor stages reduces the weight of the fuselage and increases the mass ratio of the rocket. This approach enables greater range, greater capability in boosting heavy payloads or a combination of such advantages. The upper stage rocket motor comes into operation at high altitude after the one or more lower stage rocket motors have separated from the vehicle.

Rocket motor propulsion systems for rockets and missiles are generally either liquid propellant or solid propellant-based, although so-called "hybrid" propulsion systems using both solid and liquid propellant components are known.

Liquid propellant rocket engines mix liquid fuel and liquid oxidizer in a combustion chamber in a specific proportion and at flow rates designed to cause the liquid to spontaneously combust. Propulsion thrust occurs as the gaseous combustion products are expelled from the rocket motor's exhaust nozzle. Liquid propellant rocket engines can be controlled, stopped and restarted. Disadvantages of using a liquid propellant include the volatility of the liquid fuel, the high level of care required during storage and handling thereof and the requirement that the propellant be loaded into the rocket motor immediately prior to launch.

Solid propellant rocket motors employ a propellant comprising a solid fuel charge or "grain" which burns to generate exhaust gases and other combustion products, which are expelled through a nozzle of the rocket motor to provide thrust. Once a grain of solid propellant is ignited it is difficult to extinguish and the entire grain is ordinarily consumed after ignition. Additionally, effecting variation of thrust is more difficult in solid propellant than in liquid propellant rocket engines. However, simple structural design of solid propellant rocket motors and ease of storage of the solid propellant are advantages of the solid propellant motor.

One method of fabricating a solid propellant rocket motor having the capability for shut down and reignition is to provide multiple propellant masses or "pulses." Each "pulse" may be one layer or zone of solid propellant disposed in a combustion chamber, with a flame-inhibiting barrier separating the layers. The flame-inhibiting barrier is made of a material that will confine the propellant burning to a single layer or zone, yet is selectively destructible so that the next adjacent layer may be ignited. The burning of each layer of solid propellant produces a thrust in the form of a discrete pulse. The number of pulses, as well as the burn time of each pulse, commonly termed the "duty cycle," must be sized prior to fabrication of the rocket motor. These requirements limit operational flexibility of the rocket motor. In addition, thrust may only be terminated once a pulse burns out.

One method for termination of the combustion of the propellant in a solid propellant rocket motor is rapid depressurization of the pressure vessel in which such combustion takes place. Depressurization may be effected by explosive ejection of a plug sealing an opening in the wall of the pressure vessel. An alternate depressurization method is to explosively sever the nozzle assembly from the aft end of the rocket to open up a substantially larger exit port, causing rapid depressurization. The disadvantage of these approaches is the associated extremely high acceleration jolt, whether in a forward, rearward, or axially offset direction. Further, these approaches limit, if not destroy, any subsequent operability of the rocket motor.

Attitude control, in the form of influencing the pitch, yaw, and/or roll of the rocket assembly in flight, may be accomplished with a thrust vector control (TVC) system or a separate attitude control system (ACS).

A TVC system may comprise an axial thrust nozzle rotationally positionable at a desired angle within a range offset from the longitudinal axis of the rocket motor to alter the vector at which the combustion products exit the rocket motor. Repositioning of the nozzle alters the direction of the forces acting on the vehicle in which the rocket motor is installed to alter the vehicle's direction of flight. Single, moveable TVC nozzles provide adequate control over the rocket assembly's yaw and pitch, but do not provide any significant degree of roll control.

Multiple rocket engines or gas generators and associated thrusters are often employed to control attitude. The rocket engines or thrusters are offset from the longitudinal axis of the rocket motor assembly so that firing of selected ones or groups of the engines or powering of selected ones or groups of thrusters enables attitude control over the rocket motor assembly. Use of a separate ACS in combination with one or more axial thrust engines or thrusters increases the weight of the rocket motor assembly due to the additional hardware. A separate ACS may use a solid-propellant gas generator directly connected to a manifold providing a selective hot gas flow to nozzle valve clusters.

Roll control may be provided by the ACS or through the inclusion of a separate roll control system (RCS). Separate gas generators and thrusters may be provided for the RCS.

In view of the above-enumerated deficiencies in the state of the art with respect to both liquid propellant rocket engines and solid propellant rocket motors, it would be desirable to develop a rocket motor which uses a solid propellant which may be selectively extinguished and reignited a plurality of times. A rocket motor offering integral attitude control capabilities, including pitch, yaw and roll control capabilities, would also be desirable.

BRIEF SUMMARY OF THE INVENTION

In accordance with one aspect of the present invention, a propulsion system in the form of a rocket motor offering extended mission time, intermittent operability and steerability is provided. The rocket motor includes a pressure vessel containing a solid propellant in communication with a selectively controllable axial thrust valve operably coupled with an axial thruster and selectively controllable maneuver control valves operably coupled with one or more maneuver control thrusters. Maneuver control capabilities may include pitch, yaw and roll and, as used herein, the term "maneuver control" includes alteration of, or the capability for altering, one or more of the foregoing positional parameters of the rocket motor and associated payload, which may in combination also be termed the "vehicle." The axial thrust valve and maneuver control valves may comprise proportional, or throttling, type valves configured to provide one or more partially open operational modes between full open and full closed. As used herein, the term "proportional valve" includes a valve having at least one partially operational mode between full open and full closed. The axial thruster and some or all of the maneuver control thrusters may be operated separately or simultaneously. The cross-sectional exit area through the axial thrust valve may be selectively reduced during operation of the maneuver control thrusters to maintain a substantially constant axial thrust and, thus, vehicular velocity. The solid propellant mass may be sized to provide axial thrust of a desired magnitude and duration while also providing thrust for maneuver control.

In accordance with another aspect of the present invention, the solid propellant grain may be selectively extinguished a plurality of times through rapid depressurization of the pressure vessel to extend the mission time. The axial thrust valve and maneuver control valves may be used in combination to depressurize the pressure vessel sufficiently to extinguish the solid propellant grain by fully opening the valves. Sufficient thermal mass and continued ablation exist within the rocket motor to provide the necessary conditions for subsequent reignition. Reignition of the rocket motor may be accomplished within a given time interval through the closing of all (thrust and maneuver control) of the valves. Reignition delay time may be reduced through the use of igniter grains.

In accordance with another aspect of the present invention, a plurality of solid propellant grains or pulses and associated pulse igniters may be provided within the pressure vessel to provide propellant reignition in the event that a delay following extinguishment of the solid propellant exceeds the time in which propellant reignition can be initiated having only residual heat within the motor.

In accordance with yet another aspect of the present invention, a hybrid propulsion system providing a flowable oxidizer source used in conjunction with a solid propellant grain disposed within a pressure vessel may be employed to implement the present invention and, as used herein, the term "solid propellant" rocket motor includes such hybrid propulsion systems. Further, the present invention encompasses a so-called "reverse" hybrid propulsion system wherein a solid oxidizer grain may be used in conjunction with a flowable propellant.

BRIEF DESCRIPTION OF THE SEVERAL VIEWS OF THE DRAWINGS

The foregoing and other advantages of the invention will become apparent upon reading the following detailed description and upon reference to the drawings in which:

FIGS. 6 through 8 are axial views of another exemplary maneuver control valve and maneuver control thruster configuration according to the present invention in different modes of operation;

DETAILED DESCRIPTION OF THE INVENTION

Figure 1:
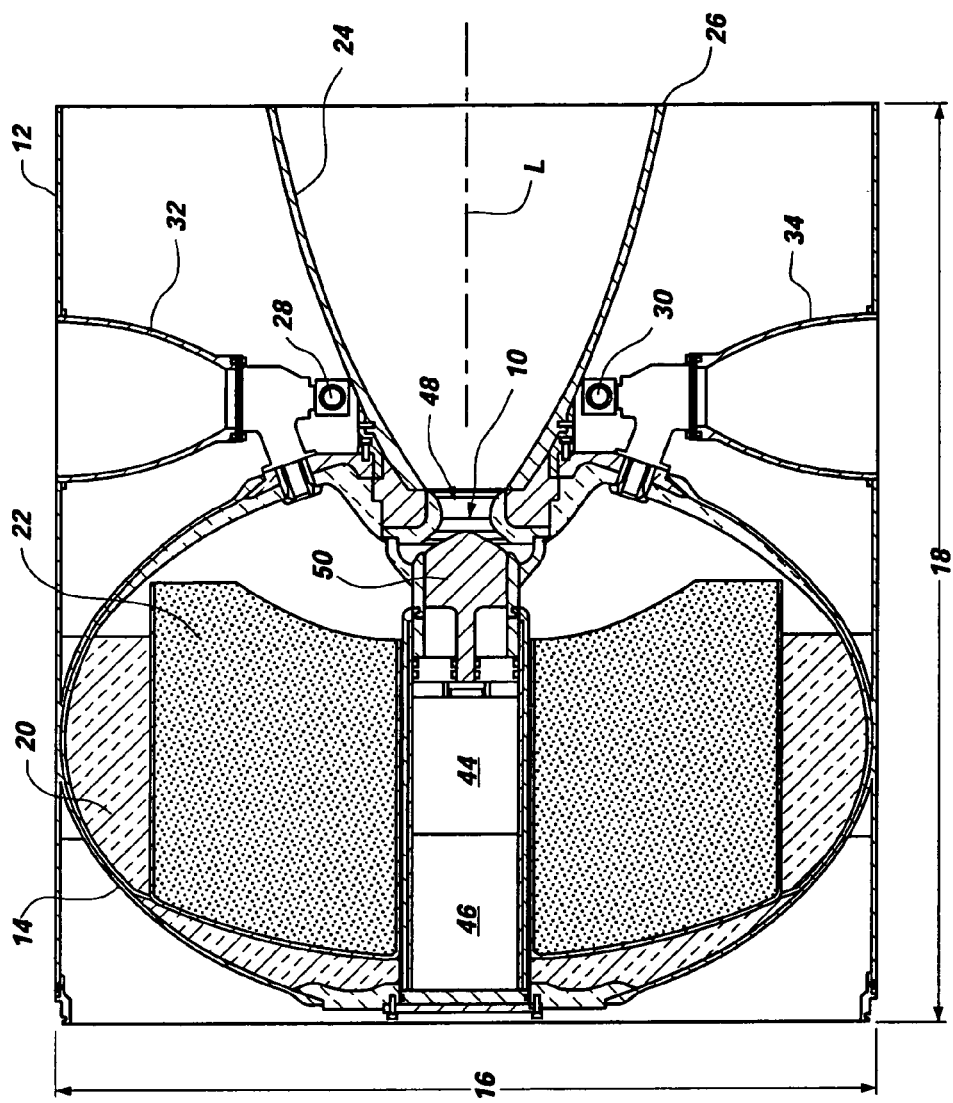
FIG. 1 shows an exemplary rocket motor embodiment according to the present invention in longitudinal cross-section.

One exemplary embodiment of a rocket motor according to the present invention, which may comprise an upper or final stage rocket motor, is depicted in FIG. 1. The motor case assembly comprises a motor case housing 12 which houses the pressure vessel 14 (also sometimes termed a "motor case") having a plurality of valves in communication therewith. Within the pressure vessel 14, low density foam 20 surrounds and insulates the solid propellant grain 22. In one exemplary, nonlimiting implementation of the present invention, the motor case assembly within motor case housing 12 may have a diameter 16 of between about 25 and 30 inches, currently preferred to be 27.6 inches and a length 18 of between 30 and 35 inches, currently preferred to be 32 inches. Solid propellant grain 22 may comprise, for example, a free standing class 7 HMX (cyclotetramethylenetetramine)-oxidized composite propellant with a binder system based on hydroxyl-terminated polybutadiene (HTPB) polymer and cured with isophorone diisocyanate (IPDI) curative including a small amount of carbon black as an opacifier, the propellant being formulated to burn stably over a wide pressure range. Alternatively, solid propellant grain 22 may comprise, for example, an aluminum powder-fueled, hydroxyl-terminated polybutadiene (HTPB) polymer-based binder. One currently preferred propellant is a nonaluminized HTPB propellant grain of 228 lbm for the above-sized rocket motor. The solid propellant chosen for use may be any of those known to one of ordinary skill in the art, as the present invention does not require a specific propellant for implementation.

Figure 2:
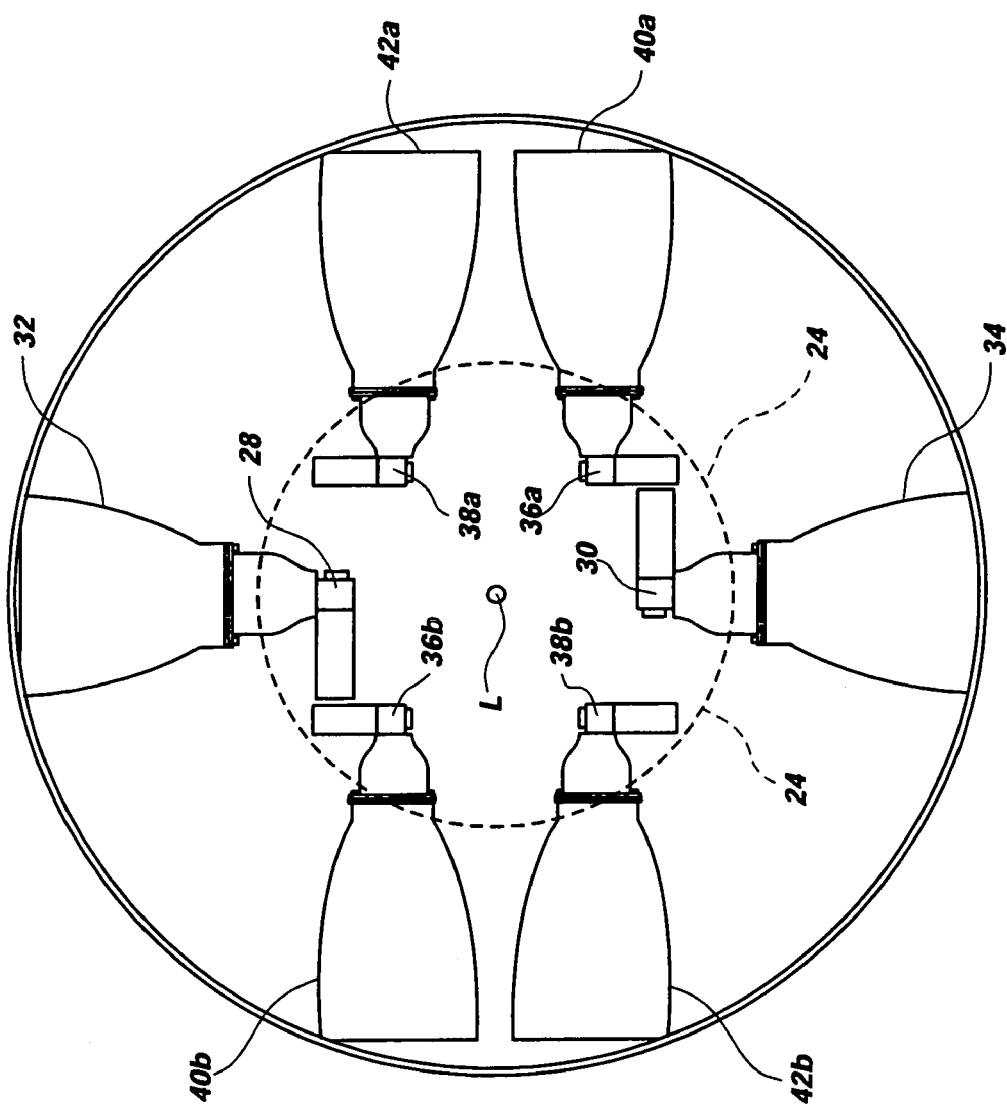
FIG. 2 is a schematic axial view of the maneuver control valves and maneuver control thrusters of the rocket motor embodiment of FIG. 1.
Figure 3:
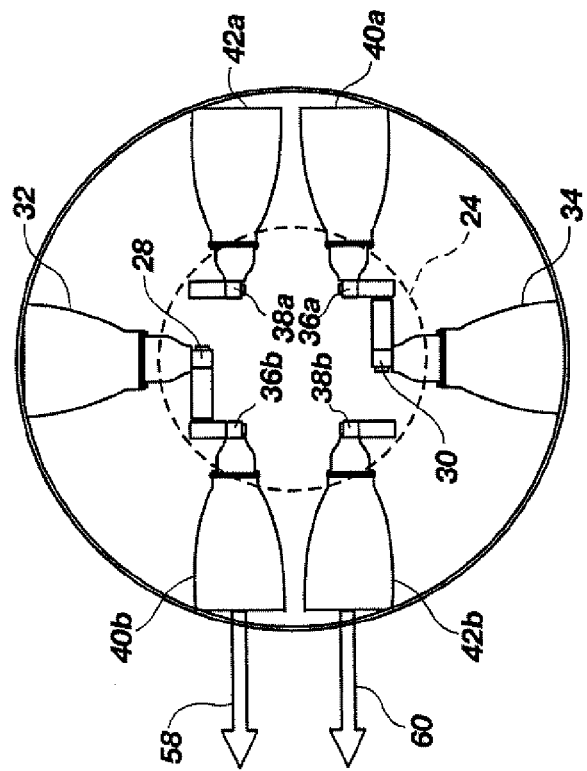
FIGS. 3 through 5 show the maneuver control valves and maneuver control thrusters of the rocket motor embodiment of FIG. 1 in different modes of operation.

The axial thrust valve 10 may comprise a pintle valve configured for proportional operation and control of axial thrust through axial thruster 26, which may be configured, by way of example only, to provide a maximum of 4,000 lbf of thrust. As best observable from FIG. 2, which illustrates the exit cone 24 of axial thruster 26 in broken lines for clarity, maneuver control thrusters 32, 34, 40a, 40b, 42a, 42b are respectively operably coupled to maneuver control valves 28, 30, 36a, 36b, 38a, 38b and located and oriented to effect maneuvering functions including pitch, yaw and roll control. Maneuver control valves 28, 30, 36a, 36b, 38a, 38b may comprise proportional valves. As depicted in FIGS. 2 and 3, selective operation of two maneuver control valves 28, 30 with respectively associated coplanar maneuver control thrusters 32, 34 located 180° apart and oriented transverse to the longitudinal axis L of the rocket motor may be used for pitch control. Yaw control may be effected by selective operation of either paired maneuver control thrusters 40a and 42a by maneuver control valves 36a and 38a or paired and diametrically opposed maneuver control thrusters 40b and 42b by maneuver control valves 36b and 38b. As shown, paired maneuver control thrusters 40a and 42a and 40b and 42b are coplanar, oriented transverse to longitudinal axis L of the rocket motor and may be used to provide balanced, parallel thrust vectors to either side of longitudinal axis L at identical lateral offsets therethrough. Roll control may be effected by selectively using two sets of maneuver control valves 36a, 36b, 38a, 38b and respectively associated coplanar maneuver control thrusters 40a, 40b, 42a, 42b. Roll in a first rotational direction may be effected by opening maneuver control valves 36a and 36b to power maneuver control thrusters 40a and 40b and cause them to provide a first set of opposing but complementary thrust vectors laterally offset from longitudinal axis L, while roll in a second direction may be effected by opening maneuver control valves 38a and 38b to power maneuver control thrusters 42a and 42b and cause them to provide a second set of opposing but complementary thrust vectors laterally offset from longitudinal axis L.

Increasing the total flow area by opening any of the aforementioned valves during combustion of solid propellant grain 22 will necessarily decrease pressure within the pressure vessel 14. This will reduce the burn rate of the propellant and, therefore, diminish thrust. In an exemplary embodiment of the invention, when the axial thrust valve 10 is in the fully open position, and all other valves are closed, the internal pressure within pressure vessel 14 may be such that the solid propellant grain 22 will have the lowest possible steady state burn rate, which corresponds to the minimum desired thrust. This operational mode enables the rocket motor to operate for the longest possible mission time.

With all of the attitude control valves closed, higher operating pressure within pressure vessel 14 and correspondingly higher thrust may be accomplished by partially closing the axial thrust valve 10. Partially closing the axial thrust valve 10 will reduce the effective cross-sectional area of the nozzle throat 48, resulting in a higher operating pressure and therefore higher thrust. This will decrease the mission time. As noted above, the axial thrust valve 10 may comprise a pintle valve, with actuator 44, powered by battery 46 moving the pintle element 50 toward and away from the nozzle throat 48 to change the nozzle throat area to alter pressure within the pressure vessel 14 and resulting thrust. While only a single axial thrust valve and associated axial thruster are depicted in the foregoing embodiment, it is contemplated that more than one axial thrust valve and associated axial thruster may be employed without departing from the scope of the present invention. Maneuver control valves 28, 30, 36a, 36b, 38a and 38b may, as with axial thrust valve 10, be actuated by battery-powered actuators (not shown) powered by battery 46 or one or more other batteries. Alternatively, the valves, if electrically actuated, may be powered by a fuel cell. Thrust to any one of the maneuver control or axial thruster valves may be controlled proportionately and substantially independently of the thrust provided to any other thruster valves. For example, the thrust provided to maneuver control (pitch) thruster 32 by maneuver control valve 28 may be set to 100 lbf while all other maneuver control valves are producing a negligible amount of thrust through their associated thrusters. Then, to increase thrust in, for example, the yaw direction while maintaining the thrust in the pitch direction, maneuver control (yaw) valves 36a and 38a may be opened and maneuver control valves 30, 36b and 38b may be closer further. By closing the maneuver control valves 30, 36b and 38b further, the pressure in pressure vessel 14 is increased to increase mass flow. By opening maneuver control (yaw) valves 36a and 38a further, more mass flow is directed out of those valves into their associated yaw maneuver control thrusters 40a and 42a, producing increased thrust. Mass flow and, therefore, burn time, may also be controlled substantially independently of other system variables. For example, a null thrust and low mass flow scenario may be created by opening all of the valves to the point where all thrusts are offsetting and a minimum steady state mass flow exists. To increase mass flow and keep maneuver thrust the same, all valves may be closed partially to increase pressure in the pressure vessel 14, thereby increasing mass flow. Minimization of mass flow while meeting other system requirements is the generally preferred operational state.

Changes in internal temperature will affect the pressure within the pressure vessel 14. Temperature as well as pressure sensors may be added to the pressure vessel 14 to monitor these parameters, and the axial thrust valve flow area may be modulated to compensate for such temperature effects to achieve a substantially constant axial thrust, if desired. Flow through one or more maneuver control valves 28, 30, 36a, 36b, 38a and 38b may also be modulated to affect pressure within the pressure vessel 14 to compensate for temperature effects, or to achieve desired thrust levels. The addition of pressure sensors (transducers) to the pressure vessel 14 to monitor chamber pressure thereof is desirable since factors other than temperature such as, for example, manufacturing variations will affect system performance. The use of pressure transducers enables modulation of the flow through the valves communicating with the pressure vessel 14 to compensate for any factors that affect chamber pressure. Feedback from the pressure transducers may also be used in a closed loop control system to control desired parameters of the propulsion system. Accelerometers may also be added to the rocket motor to provide a more accurate measurement by which thrust may be predicted or system performance monitored. Feedback from the accelerometers may also be used in a closed loop control system to control desired parameters of the propulsion system.

In another exemplary embodiment of the invention, additional maneuver control valves may be used. Further, pitch and yaw maneuver control thrusters may have mass flow provided thereto by the solid propellant grain used to provide mass flow for the axial thruster and a separate gas generator and associated thrusters may be provided for roll control. Alternatively, maneuver control thrusters for roll may be provided with mass flow by the solid propellant grain used to provide mass flow for the axial thruster and a separate gas generator and associated thrusters provided for pitch and yaw control. Finally, a pitch and roll or yaw and roll thruster set may be provided with mass flow by the solid propellant grain used for axial thrust, and the other maneuver control parameter, yaw or pitch, controlled by a separate system. However, due to fabrication and operational complexity as well as added vehicle weight, these alternatives are currently less preferred.

The maneuver control thrusters for pitch, yaw and roll may, instead of being aimed transversely to the longitudinal axis L of the rocket motor, be oriented to release gases substantially in the direction of axial thrust (not shown). Thus, pitch, yaw and roll control thrusters may be individually offset from the longitudinal axis L of the rocket motor; however, these maneuver control thrusters may, for example, be located and oriented to collectively form a concentric ring about the longitudinal axis L of the rocket assembly, so that simultaneous operation of certain or all of the associated maneuvering valves causes the maneuver control thrusters to provide thrust to the vehicle without adjustment in pitch, yaw or roll. In such a configuration, and if the maneuver control thrusters may provide sufficient axial thrust, the presence of a separate, main axial thrust valve to provide axial thrust is optional.

Figure 4:
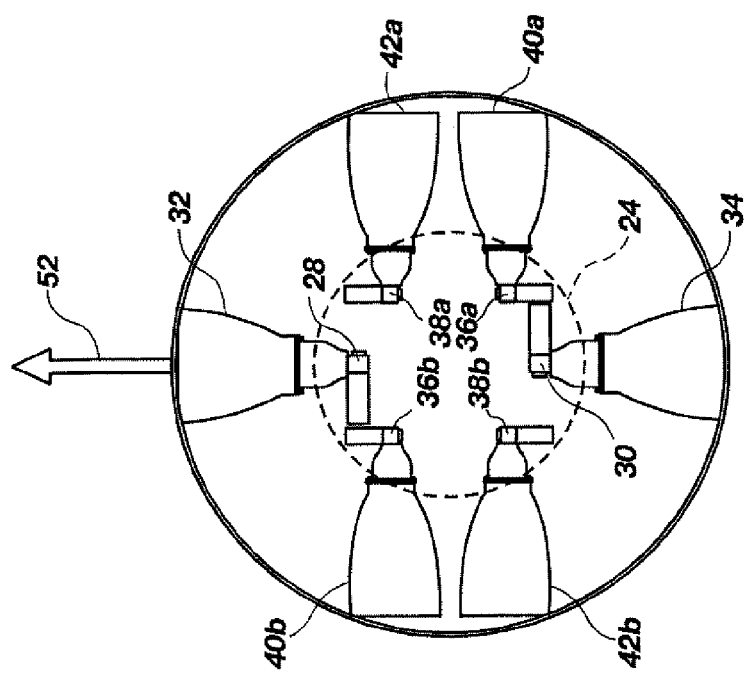

FIG. 3 illustrates one mode of operation of the solid propellant propulsion system of FIG. 1 to effect pitch control. Opening maneuver control valve 28 (see also FIG. 1) will produce a thrust through maneuver control thruster 32 in the direction depicted by direction arrow 52. Influence of the yaw of the vehicle, illustrated in FIG. 4, may be effected in another mode of operation by opening maneuver control valves 36b and 38b to produce parallel thrust vectors from thrusters 40b and 42b in the direction depicted by arrows 58, 60.

Figure 5:
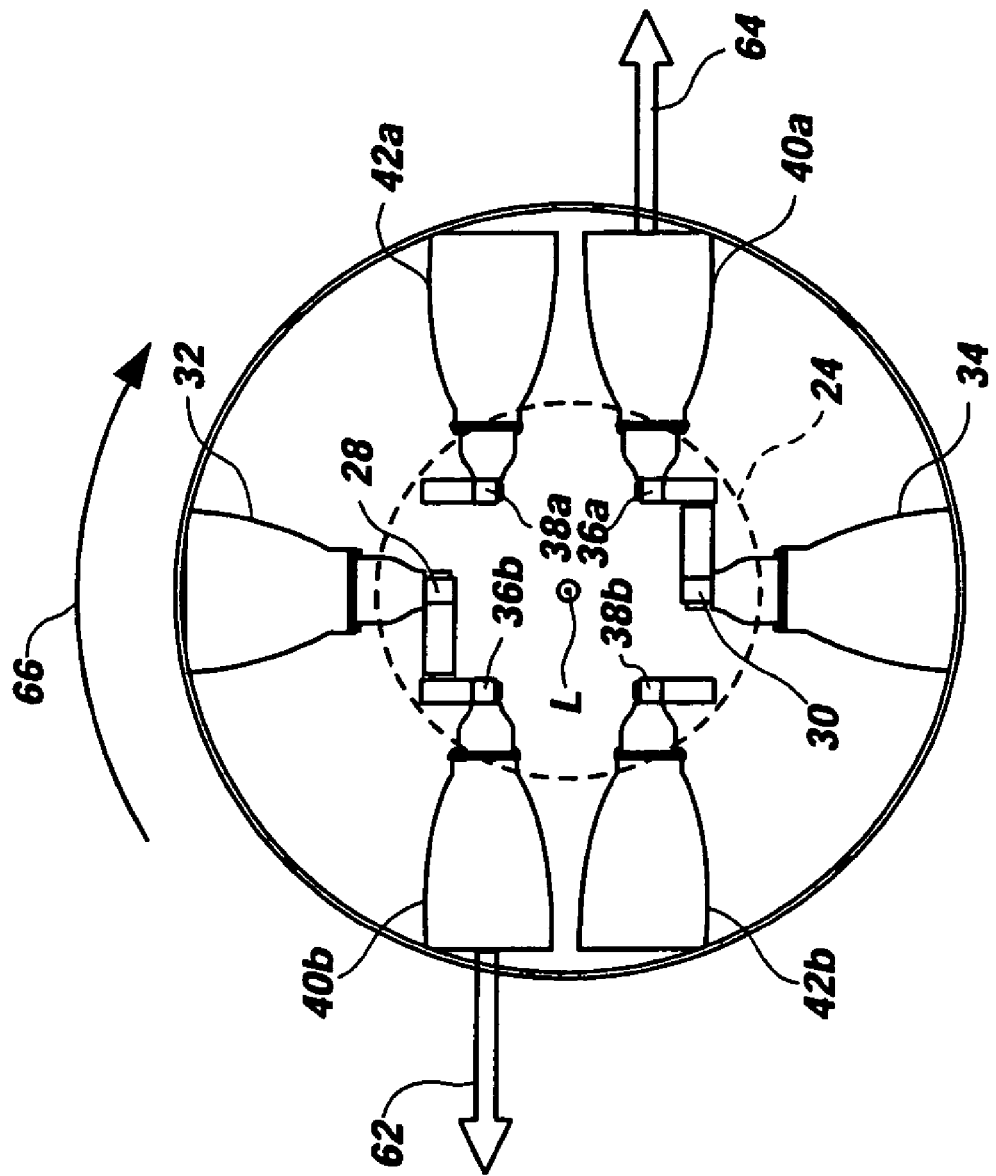

Roll control may be achieved by the mode of operation illustrated in FIG. 5. Opening two maneuver control valves, such as valves 36a and 36b to respectively power opposing, off-axis maneuver control thrusters 40a and 40b, produces offset thrust about longitudinal axis L in a common plane transverse to longitudinal axis L in directions 62 and 64, causing the vehicle to roll in a clockwise direction 66. With the addition of propellant mass above that which is required for axial thrust, maneuvering functions can thus be performed without affecting axial thrust levels. The maneuver control thrusters 32, 34 may be smaller than the axial thruster 26 (see FIG. 1), with each maneuver control thruster 32, 34 for pitch control and each maneuver control thruster of the two sets of yaw and roll maneuver control thrusters 40a, 40b and 42a, 42b providing a smaller force than the axial thruster 26. For example, and not by way of limitation, maneuver control thrusters 32 and 34 for pitch control may be designed to each provide 1,000 lbf maximum thrust capability, while maneuver control thrusters 40a, 40b, 42a and 42b for yaw and roll control may each be designed to provide a 500 lbf maximum thrust capability.

FIGS. 6 through 8 illustrate an exemplary configuration of maneuver control valves 74, 76, 78, and 80 and associated maneuver control thrusters T in another exemplary embodiment of the invention. In this embodiment, maneuver control thrusters T may each comprise, for example, a thruster designed to provide 1,500 lbf of thrust. As shown in FIG. 6, opening maneuver control valves 74 and 78 in one mode of operation produces thrust in directions 84 and 88 for adjusting pitch of the vehicle. In FIG. 7, maneuver control valves 74 and 76 are opened in another mode of operation for producing thrust in directions 84 and 86 for controlling yaw of the vehicle. FIG. 8 depicts roll control accomplished through opening maneuver control valves 74 and 80 in yet another mode of operation, producing thrust in directions 84 and 90 for causing the vehicle to roll in counterclockwise direction 82.

Figure 10:
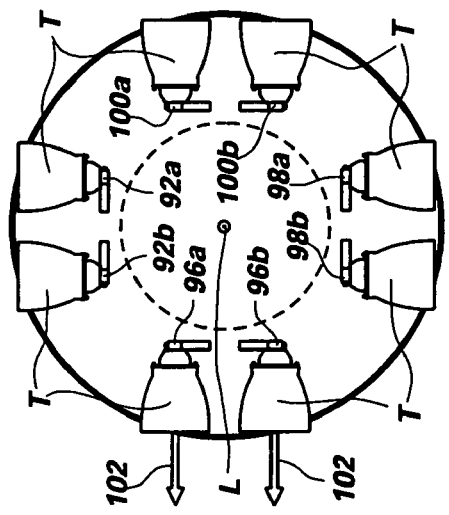
FIGS. 9 through 11 are views of yet another exemplary maneuver control valve and maneuver control thruster configuration according to the present invention in different modes of operation.
Figure 11:
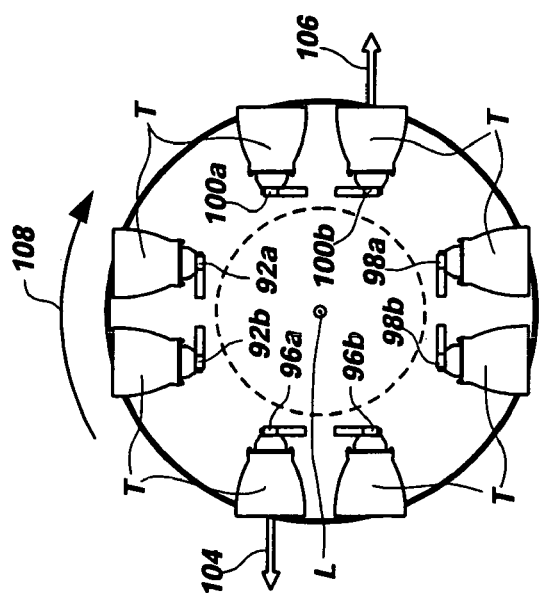
Figure 9:
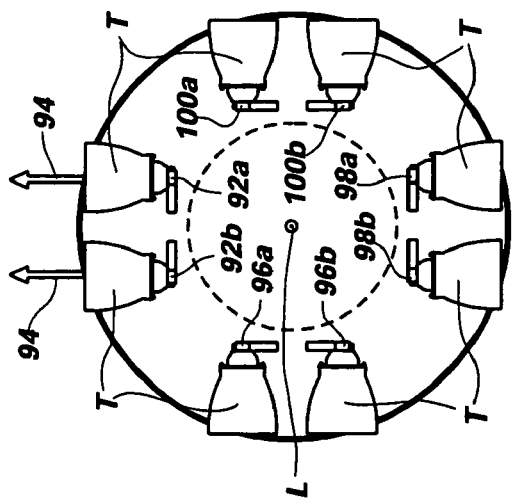

FIGS. 9 through 11 illustrate yet another exemplary embodiment of the invention and the configuration of maneuver control valves 92a, 92b, 96a, 96b, 98a, 98b, 100a and 100b and associated maneuver control thrusters T thereof. In this embodiment, maneuver control thrusters T may each comprise, for example, a thruster designed to provide 500 lbf of thrust. FIG. 9 depicts one mode of operation for controlling pitch of the vehicle. The pair of maneuver control valves 92a and 92b is opened to create a force in direction 94. FIG. 10 shows adjustment of yaw of the vehicle in another mode of operation by opening maneuver control valves 96a and 96b for creating thrust in direction 102. Roll control, pictured in FIG. 11, may be achieved by opening two, off-axis maneuver control valves 96a and 100b in yet another mode of operation to produce thrust in the opposing and parallel but laterally offset directions depicted by arrows 104 and 106, causing the vehicle to roll in a clockwise direction 108.

The thrust vector of the axial thruster 26 (see FIG. 1) may additionally be altered by use of a gimbaled, rotationally moveable nozzle exit cone to perform or assist in attitude control functions. As noted above, all maneuver control and axial thrust valves may be proportional valves. The proportional valves may be controlled electrically, pneumatically, hydraulically or mechanically and they may be linearly or nonlinearly acting in their modes of operation. Each proportional valve may be configured to be shut down completely as well as to achieve a high thrust turn-down ratio.

Figure 13:
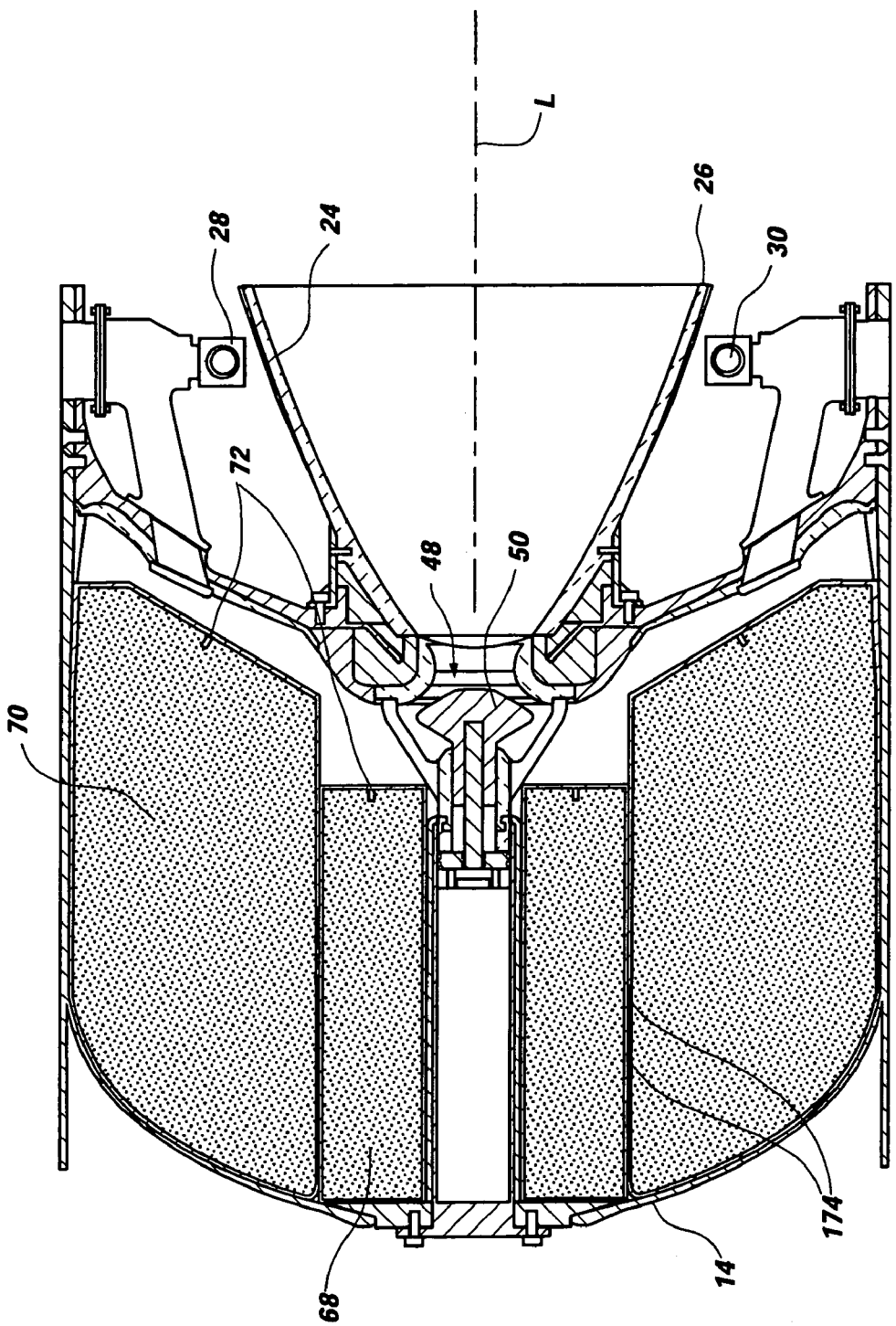
FIG. 13 is a cross-sectional view of another embodiment of the invention employing a plurality of pulses with associated pulse igniters.

The incorporation of the pitch, yaw and roll control functions in conjunction with the main motor may also be applied to a hybrid engine containing a solid propellant grain. While the present invention has been described with respect to exemplary embodiments structured as solid propellant rocket motors, it is also contemplated that the present invention may be implemented in the form of a hybrid rocket engine, wherein an oxidizer fluid source is used in conjunction with a solid propellant grain, as known in the art. Starting flow of the oxidizer to the solid propellant grain through opening of a controllable valve, in conjunction with the use of an ignition source where conditions require, may be used to initiate (or reinitiate) combustion of the solid propellant grain and start the engine, while closing the valve to stop flow of the oxidizer fluid to the solid propellant grain may be used to stop the engine. Thus, the need for multiple pulses or solid propellant grains, as described below with respect to FIG. 13, is eliminated.

Figure 14:
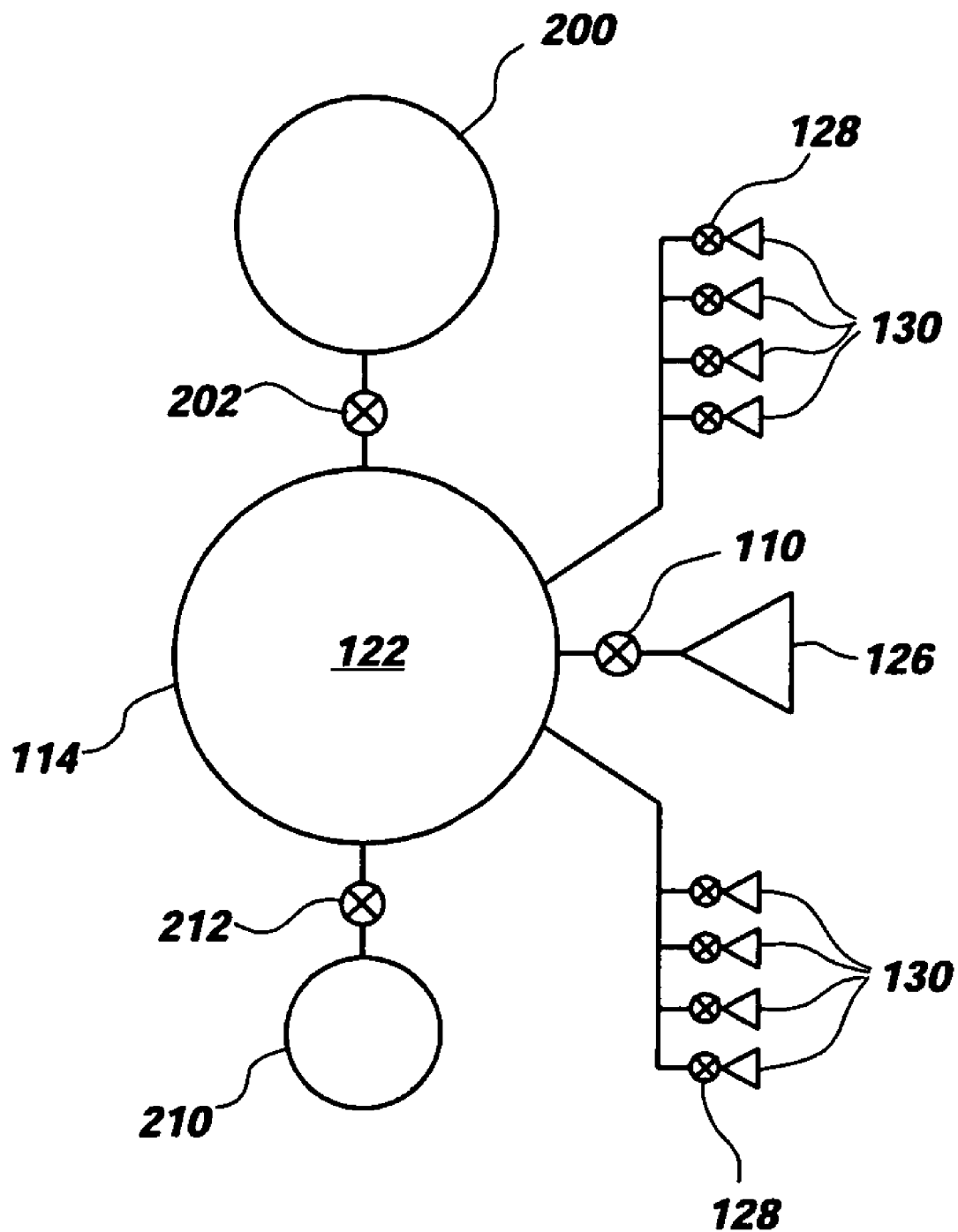
FIG. 14 is a schematic diagram of a hybrid rocket engine configuration which may be used to implement the present invention.

FIG. 14 depicts, in schematic form, an exemplary configuration for a hybrid rocket engine. Details of the structure of and suitable propellants, oxidizers and ignition sources for use in, such a hybrid rocket engine are known to those of ordinary skill in the art, and may also be found, for example, in U.S. Pat. No. 6,393,830, assigned to the assignee of the present invention and the disclosure of which patent is incorporated herein by reference. A hybrid rocket engine according to the present invention may comprise a pressure vessel 114 containing a suitable solid propellant grain 122. Pressure vessel 114 is in selective communication with an axial thruster 126 through axial thrust valve 110 and in selective communication with a plurality of maneuver control thrusters 130 for pitch, yaw and roll control through respectively associated maneuver control valves 128. Any suitable number of maneuver control valves 128 and associated maneuver control thrusters 130 may be employed as desired or required, depending on the maneuver control thruster layout chosen. Axial thrust valve 110 and maneuver control valves 128 may comprise proportional, or throttling type valves. An oxidizer source 200 is disposed in selective communication with pressure vessel 114 through control valve 202, which may comprise a proportional, or throttling type valve. An ignition fluid source 210 is also disposed in selective communication with pressure vessel 114 through control valve 212, which may also comprise a proportional, or throttling type valve. Combustion of solid propellant grain 122 may be initiated by starting flow of oxidizer from oxidizer source 200 in combination with ignition fluid from ignition fluid source 210. Operation of the hybrid rocket engine for axial thrust and maneuver control may be conducted generally as described with respect to the solid rocket motor embodiments herein. However, termination of combustion of solid propellant grain 122 may be terminated by terminating flow of oxidizer from oxidizer source 200 by closing control valve 202. Combustion of solid propellant grain 122 may be reinitiated by restarting flow of oxidizer from oxidizer source 200, as desired and, where combustion has been terminated for an extended period of time, by supplying ignition fluid from ignition fluid source 210. The present invention may also be implemented in the form of a so-called "reverse" hybrid rocket engine, as disclosed in the aforementioned patent, wherein a solid oxidizer grain may be employed in pressure vessel 114 and a flowable source of propellant selectively supplied thereto. Therefore, as used herein, the term "hybrid" rocket engines includes both types.

Referring again to FIGS. 1 and 2, axial thrust termination may be accomplished by closing down the axial thrust valve 10 while simultaneously opening all maneuver control valves 28, 30, 36a, 36b, and 38a and 38b. All combustion gases will vent radially from pressure vessel 14, in equal and opposite directions, balancing any forces which would result in the vehicle deviating from its intended path. During this axial thrust termination phase, sufficient pressure exists within pressure vessel 14 for continued burning of the solid propellant grain 22.

If desired, the solid propellant grain 22 may be extinguished at an appropriate time to preserve fuel for use at a later time. Fully opening all valves, comprising the axial thrust valve 10 in combination with all maneuver control valves such as 28, 30, 36a, 36b, 38a and 38b, will cause rapid depressurization of the pressure vessel 14. The resulting reduced pressure within pressure vessel 14 will extinguish the solid propellant grain 22. However, sufficient thermal mass, aided by the presence of low density foam 20, and continued ablation exists within the motor case or pressure vessel 14 to provide the necessary conditions for reignition at a later time. Closing all valves will increase the pressure within the pressure vessel 14 and reignite the solid propellant grain 22. The ability to shut down and restart the rocket motor results in a theoretically infinite number of possible duty cycles which can be carried out on demand.

Figure 12:
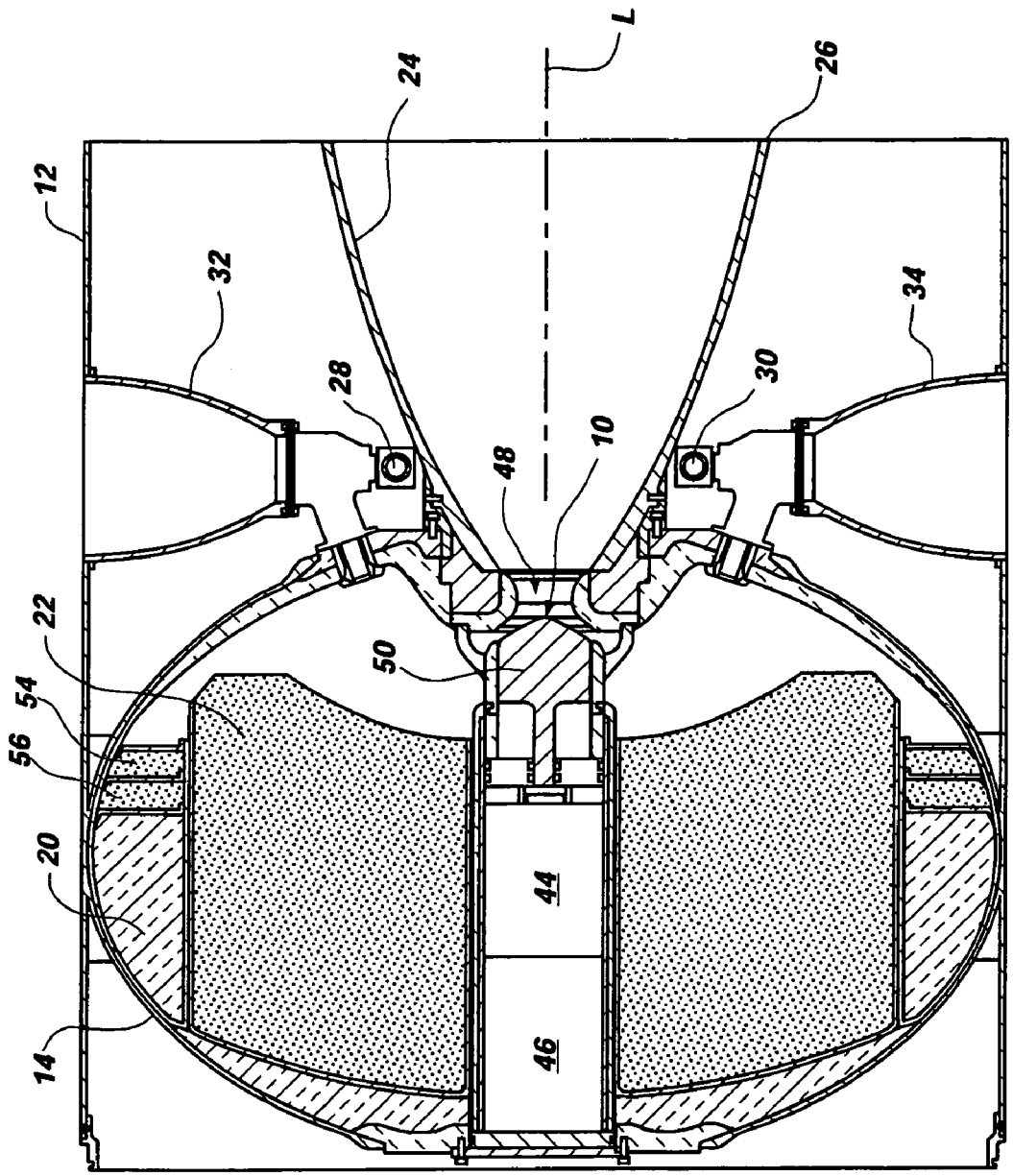
FIG. 12 is a longitudinal cross-sectional view of another exemplary embodiment of the invention employing igniter grains.

Faster reignition of the solid propellant grain 22 may be accomplished through implementation of another exemplary embodiment illustrated in FIG. 12, through the addition of one or more igniter grains 54, 56 within pressure vessel 14. The igniter grains 54, 56 may be used selectively to provide a source of additional heat to increase the pressure within the pressure vessel 14 and provide additional thermal energy to shorten the ignition time. Once the internal pressure has risen to an appropriate level, selected valves may be opened to desired positions to provide the desired thrust attitude and roll control for the vehicle. Of course, more or fewer than two igniter grains may be employed.

After an extended time delay subsequent to extinguishment of a propellant grain, the amount of residual heat in the rocket motor may be insufficient for reignition to occur. Yet another exemplary embodiment of the present invention, depicted in FIG. 13, includes a rocket motor offering the capability to initiate a plurality of pulses without regard to time delay. A first solid propellant grain 68 may fire until extinguished or burned out, producing a first pulse in isolation from second solid propellant grain 70 due to the interposition of flame-inhibiting barriers 174 associated with solid propellant grains 68 and 70, then the second solid propellant grain 70 may be selectively ignited at another time to produce a second pulse. Underbarrier igniters 72 (FIG. 13), or other forms of igniters such as electrical or pyrotechnic igniting devices, may be used to ignite a selected segment or grain of the propellant to initiate each pulse. Further, the propellant grains used for some or each of the multiple pulses may be formulated to exhibit the same or different burn rates. It is, of course, contemplated that more than two propellant grains pulses may be employed.

It is further contemplated that multiple solid propellant grains may be used in combination with igniter grains, in a combination of the embodiments of FIGS. 12 and 13 to provide reduced time for reignition of a particular segment of propellant as well as a plurality of discrete, isolated propellant grains for sequential ignition.

While the present invention has been disclosed in terms of certain exemplary embodiments, those of ordinary skill in the art will recognize and appreciate that the invention is not so limited. Additions, deletions, and modifications to the disclosed embodiments may be effected without departing from the scope of the invention as claimed herein. Similarly, features from one embodiment may be combined with those of another while remaining within the scope of the invention.

What is claimed is:

1. A propulsion system, comprising:
   a pressure vessel containing a propellant, wherein the propellant comprises at least one solid propellant grain;
   at least one axial thrust valve in communication with the pressure vessel and configured for selectively releasing gases generated by combustion of the propellant within the pressure vessel to directly provide axial thrust; and
   at least one maneuver control valve in communication with the pressure vessel and configured for selectively releasing gases generated by combustion of the propellant within the pressure vessel to provide thrust for maneuvering, wherein the at least one axial thrust valve and the at least one maneuver control valve are operable in combination for simultaneous opening to rapidly reduce pressure within the pressure vessel to a degree sufficient to substantially extinguish combustion of the at least one solid propellant grain.

2. The propulsion system of claim 1, wherein the at least one axial thrust valve is configured as a proportional valve.

3. The propulsion system of claim 1, wherein the at least one maneuver control valve is configured as a proportional valve.

4. The propulsion system of claim 1, wherein the at least one axial thrust valve is in communication with a thruster located and oriented to provide axial thrust along a longitudinal axis.

5. The propulsion system of claim 4, wherein the at least one maneuver control valve comprises two maneuver control valves, each of the two maneuver control valves in communication with at least one thruster located and oriented to provide maneuver control.

6. The propulsion system of claim 5, wherein the two maneuver control valves each comprise a valve in communication with a mutually opposing thruster located on opposing sides of the longitudinal axis and oriented to effect a change in pitch responsive to selective operation of one of the two maneuver control valves.

7. The propulsion system of claim 6, wherein the mutually opposing thrusters are located in a common plane transverse to the longitudinal axis.

8. The propulsion system of claim 4, wherein the at least one maneuver control valve comprises four maneuver control valves, each maneuver control valve in communication with at least one thruster, the at least one thruster located offset from the longitudinal axis and oriented to effect a change in yaw or roll responsive to selective operation of at least one of the four maneuver control valves.

9. The propulsion system of claim 8, wherein the at least one thruster is disposed as two mutually opposing pairs of thrusters, each thruster pair including mutually parallel thrusters.

10. The propulsion system of claim 9, wherein the mutually opposing pairs of thrusters are located in a common plane transverse to the longitudinal axis.

11. The propulsion system of claim 4, wherein the at least one maneuver control valve comprises four maneuver control valves, each of the four maneuver control valves in communication with at least one thruster located and oriented to provide maneuver control.

12. The propulsion system of claim 11, wherein the four maneuver control valves each comprise a valve in communication with a thruster located offset from the longitudinal axis and oriented to effect a change in at least one of pitch, yaw and roll responsive to selective operation of one or more of the four maneuver control valves.

13. The propulsion system of claim 12, wherein the four thrusters in communication with the four maneuver control valves are located in a common plane transverse to the longitudinal axis.

14. The propulsion system of claim 12, wherein two of the four thrusters are oriented to provide opposing, parallel thrust offset to opposite sides of the longitudinal axis and the other two of the four thrusters are oriented to provide opposing, parallel thrust offset to opposite sides of the longitudinal axis and perpendicular to the two thrusters.

15. The propulsion system of claim 4, wherein the at least one maneuver control valve comprises eight maneuver control valves, each maneuver control valve in communication with a thruster located and oriented to provide maneuver control.

16. The propulsion system of claim 15, wherein the thrusters are disposed as four pairs of thrusters offset from the longitudinal axis, each thruster pair including mutually parallel thrusters opposing another thruster pair and located 90° circumferentially from two other thruster pairs.

17. The propulsion system of claim 16, wherein the pairs of thrusters are located in a common plane transverse to the longitudinal axis.

18. The propulsion system of claim 1, wherein the at least one solid propellant grain comprises a plurality of solid propellant grains mutually separated by a flame-inhibiting barrier.

19. The propulsion system of claim 18, further comprising at least one igniter separately associated with each solid propellant grain of the plurality.

20. The propulsion system of claim 1, further comprising at least one igniter grain associated with the at least one solid propellant grain.

21. The propulsion system of claim 20, wherein the at least one igniter grain comprises a plurality of separately actuable igniter grains.

22. The propulsion system of claim 1, wherein the pressure vessel, the at least one axial thrust valve, and the at least one maneuver control valve are disposed within a common housing.

23. The propulsion system of claim 1, wherein the at least one axial thrust valve and the at least one maneuver control valve are operable in combination for simultaneous opening to rapidly reduce pressure within the pressure vessel to a degree sufficient to substantially extinguish combustion of the at least one solid propellant grain, with at least a portion of the at least one solid propellant grain remaining.

24. A method for extinguishing a solid propellant undergoing combustion within a pressure vessel of a propulsion system, comprising:
providing a plurality of valves in communication with the pressure vessel, wherein the plurality of valves comprises at least one valve in communication with a thruster for providing axial thrust and at least two valves in respective communication with thrusters for providing thrust for maneuvering; and
opening the plurality of valves to rapidly reduce pressure within the pressure vessel to a degree sufficient to substantially extinguish combustion of the solid propellant.

25. The method of claim 24, wherein providing at least two valves in respective communication with thrusters for providing thrust for maneuvering comprises providing two valves in respective communication with thrusters for providing thrust for pitch control and four thrusters in respective communication with thrusters for providing yaw and roll control.

26. The method of claim 24, wherein providing a plurality of valves comprises providing a plurality of proportional valves.

27. The method of claim 24, wherein opening the plurality of valves comprises opening the plurality of valves to rapidly reduce pressure within the pressure vessel to a degree sufficient to substantially extinguish combustion of the solid propellant, with at least a portion of the solid propellant remaining.

28. A propulsion system for propelling and maneuvering a vehicle, the system comprising:
a pressure vessel containing at least one solid propellant charge for generating gases through combustion thereof;
at least one valve in communication with the pressure vessel and with a thruster for providing axial thrust for the vehicle by release of combustion gases from the pressure vessel;
a plurality of valves in communication with the pressure vessel and respectively in communication with thrusters located and oriented for providing maneuver control for the vehicle, wherein each valve of the plurality is selectively operable to effect at least one of pitch, yaw and roll control of the vehicle through release of combustion gases though a thruster; and
wherein the at least one valve and the valves of the plurality are operable to open fully in combination to cause rapid depressurization of the interior of the pressure vessel to substantially extinguish combustion of the at least one solid propellant charge.

29. The propulsion system of claim 28, wherein the at least one valve is controllable to adjust and maintain substantially constant pressure within the pressure vessel during combustion of the at least one solid propellant charge responsive to temperature fluctuations.

30. The propulsion system of claim 28, wherein the at least one valve and the valves of the plurality are each proportional valves.

31. The propulsion system of claim 28, wherein the at least one solid propellant charge comprises a plurality of solid propellant charges mutually separated by a flame-inhibiting barrier.

32. The propulsion system of claim 31, further comprising at least one igniter separately associated with each solid propellant charge of the plurality.

33. The propulsion system of claim 28, further comprising at least one igniter grain associated with the at least one solid propellant charge.

34. The propulsion system of claim 33, wherein the at least one igniter grain comprises a plurality of separately actuable igniter grains.

35. The propulsion system of claim 28, wherein the at least one valve and the valves of the plurality are operable to open frilly in combination to cause rapid depressurization of the interior of the pressure vessel to substantially extinguish combustion of the at least one solid propellant charge, with at least a portion of the at least one solid propellant charge remaining.

36. A solid propellant dual phase rocket motor comprising:
a pressure vessel;
a first solid pulse grain disposed within the pressure vessel and having at least one pulse igniter associated therewith;
at least another solid pulse grain disposed within the pressure vessel, separated from the first pulse grain by a flame-inhibiting barrier and having at least one pulse igniter associated therewith; and
a plurality of selectively operable proportional valves in communication with the pressure vessel, configured for selectively releasing gases generated by combustion of a solid propellant of either the first solid pulse grain or the at least another solid pulse grain within the pressure vessel, and having thrusters associated therewith.

37. A rocket motor, comprising:
a pressure vessel;
a solid propellant charge disposed within the pressure vessel for generating combustion gases;
a selectively operable axial thrust valve for release of the combustion gases from the pressure vessel to directly provide axial thrust; and
a plurality of selectively operable maneuver control valves for release of the combustion gases from the pressure vessel, wherein the axial thrust valve and the plurality of maneuver control valves are configured to effect a rapid depressurization of the pressure vessel during combustion of the solid propellant charge to substantially extinguish combustion thereof when the axial thrust valve and the plurality of maneuver control valves are fully open.

38. The rocket motor of claim 37, wherein the solid propellant charge exhibits the lowest possible steady state burn rate when the axial thrust valve is fully open and the plurality of maneuver control valves are fully closed.

39. The rocket motor of claim 37, wherein the axial thrust valve and the plurality of maneuver control valves comprise proportional valves.

40. The rocket motor of claim 37, wherein the axial thrust valve is configured for modulation of a flow area therethrough to compensate for temperature effects to provide substantially constant axial thrust.

41. The rocket motor of claim 37, further including:
at least one additional solid propellant charge disposed within the pressure vessel and separated from the solid propellant charge by a flame-inhibiting barrier; and
at least one pulse igniter associated with the at least one additional solid propellant charge.

42. The rocket motor of claim 37, further including:
a source of flowable oxidizer; and
a control valve for selectively controlling flow of the flowable oxidizer to the pressure vessel.

43. The rocket motor of claim 42, further including:
a source of ignition fluid; and
a control valve for selectively controlling flow of the ignition fluid to the pressure vessel.

44. The rocket motor of claim 37, wherein the axial thrust valve and the plurality of maneuver control valves are configured to effect a rapid depressurization of the pressure vessel during combustion of the solid propellant charge to substantially extinguish combustion thereof, with at least a portion of the solid propellant charge remaining, when the axial thrust valve and the plurality of maneuver control valves are fully open.

45. A propulsion system, comprising:
a pressure vessel containing a propellant;
at least one axial thrust valve in communication with the pressure vessel and configured for selectively releasing gases generated by combustion of the propellant within the pressure vessel to directly provide axial thrust; and
at least one maneuver control valve in communication with the pressure vessel and configured for selectively releasing gases generated by combustion of the propellant within the pressure vessel to provide thrust for maneuvering, wherein the pressure vessel, the at least one axial thrust valve, and the at least one maneuver control valve are disposed within a common housing.

46. A rocket motor, comprising:
a pressure vessel;
a solid propellant charge disposed within the pressure vessel for generating combustion gases;
a selectively operable axial thrust valve for release of the combustion gases from the pressure vessel to directly provide axial thrust; and
a plurality of selectively operable maneuver control valves for release of the combustion gases from the pressure vessel, wherein the axial thrust valve is configured for modulation of a flow area therethrough to compensate for temperature effects to provide substantially constant axial thrust.

* * * * *